(12) United States Patent
Burke et al.

(10) Patent No.: US 6,523,394 B2
(45) Date of Patent: Feb. 25, 2003

(54) LEAK TEST FIXTURE

(75) Inventors: Paul H. Burke, Portsmouth, RI (US);
Marc T. Sanford, Portsmouth, RI (US);
Raymond A. St. Amand, Fairhaven, MA (US); James Wilson, III, Fall River, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/837,747

(22) Filed: Apr. 18, 2001

(65) Prior Publication Data

US 2002/0152801 A1 Oct. 24, 2002

(51) Int. Cl.[7] .............................................. G01M 3/04
(52) U.S. Cl. ...................................................... 73/49.8
(58) Field of Search ................................ 73/49.8, 49.7, 73/40, 40.5 R, 40.7

(56) References Cited

U.S. PATENT DOCUMENTS

| | | | | |
|---|---|---|---|---|
| 2,005,348 A | * | 6/1935 | Michell | 85/32 |
| 3,340,723 A | * | 9/1967 | Harris et al. | 73/40 |
| 3,355,932 A | * | 12/1967 | Mulligan | 73/49.3 |
| 3,360,983 A | * | 1/1968 | Smith | 73/45.3 |
| 3,385,614 A | * | 5/1968 | Snyder, Jr. | 285/263 |
| 3,439,844 A | * | 4/1969 | Johnston | 222/398 |
| 3,501,945 A | * | 3/1970 | Bailey et al. | 73/40 |
| RE30,311 E | * | 6/1980 | Chaplin et al. | 73/46 |
| 4,232,262 A | * | 11/1980 | Emo et al. | 324/65 P |
| 4,260,109 A | * | 4/1981 | Courtright | 239/189 |
| 4,309,506 A | * | 1/1982 | Squires | 435/291 |
| 4,658,212 A | * | 4/1987 | Ozawa et al. | 324/158 F |
| 4,691,567 A | * | 9/1987 | Himmler et al. | 73/483 |
| 4,799,377 A | * | 1/1989 | Strong et al. | 73/40 |
| 5,201,213 A | * | 4/1993 | Henning | 73/49.2 |
| 5,360,331 A | * | 11/1994 | Wareham | 425/144 |
| 5,597,196 A | * | 1/1997 | Gibbs | 296/98 |
| 5,703,280 A | * | 12/1997 | Igura et al. | 73/40 |
| 5,831,149 A | * | 11/1998 | Webb | 73/40.5 R |
| 5,952,559 A | * | 9/1999 | Harris et al. | 73/49.7 |

OTHER PUBLICATIONS

The American Heritage® Dictionary of the English Language, Third Edition copyright© 1992 by Houghton Mifflin Company.*
Parker Fluid Connectors, Adapters, Pipe Adapters, Male Pipe Adapter 0107, MPSM swivel/male pi;e thread SAE 140130, May 29, 2000.*

* cited by examiner

*Primary Examiner*—Hezron Williams
*Assistant Examiner*—Charles D Garber
(74) *Attorney, Agent, or Firm*—James M. Kasischke; Michael F. Oglo; Jean-Paul Nasser

(57) ABSTRACT

The present invention relates to a fixture to be used during pressure/vacuum testing. The fixture includes a shell having a main body and a coupling ring surrounding the main body. The coupling ring has threads for engaging an external thread connection on the device to be tested and for facilitating installation and removal of the fixture. The fixture further includes a back plate welded to one end of the main body and a pressure adapter for connecting the fixture to a pressure source or a vacuum source. The fixture still further includes an optional insulator to be placed in contact with the device being tested.

4 Claims, 2 Drawing Sheets

LEAK TEST FIXTURE

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The present invention relates to a fixture to be used in leak tests. The fixture may be utilized to perform pressure/vacuum testing of devices, such as missile tube penetrators, having an open end and a closed end.

(2) Description of the Prior Art

A variety of devices are known in the art to be used during pressure/leak testing. For example, U.S. Pat. No. 3,045,475 to Pfundt illustrates a pressure test clamp developed for the pressurizing/testing of round cable assemblies. The clamping pressure and effectiveness in sealing of the Pfundt clamp are contingent upon the action of a spring located in the handle.

U.S. Pat. No. 3,390,569 to McMeekin illustrates a finish inspection apparatus for glass containers. This apparatus does not physically fasten to the vessel to be tested. Rather, it relies upon a constant vacuum source to remain mated.

U.S. Pat. No. 4,809,751 to McKenzie illustrates a pressure test cap. The cap uses an expandable collect to facilitate tightening/sealing against interior and exterior walls of a shaped duct. This feature renders the McKenzie cap ineffective in testing a collar having external threads.

U.S. Pat. No. 5,548,992 to Hallet et al. illustrates a device intended for use in leak detection where a trace gas is installed into the container to be tested, a part of which is then removed to allow use of a mass spectrometer. The actual leak testing is accomplished by use of the mass spectrometer.

U.S. Pat. No. 5,576,479 to Emmitte, Jr. shows a device designed for the testing of a pressure chamber where both ends of the chamber are open and accessible.

U.S. Pat. No. 5,777,209 to Tien relates to a leakage detection apparatus. The Tien apparatus includes a pressure chamber specifically sized to fit semiconductor components. The apparatus is made to be used in conjunction with a trace gas and leak detector.

These devices are not well suited to perform pressure/vacuum testing and/or to verify that there are no defects or damage on the face of the device being tested which can prevent proper sealing during the normal use of the device being tested.

SUMMARY OF THE INVENTION

Accordingly, it is an object of the present invention to provide an improved fixture for conducting pressure/leak testing.

It is a further object of the present invention to provide a fixture as above which can detect defects or damage on the face of the device being tested.

The foregoing objects are attained by the fixture of the present invention.

In accordance with the present invention, a fixture for conducting pressure/leak testing of a device comprises a shell having a main body and a coupling ring surrounding the main body. The coupling ring is provided with threads for engaging an external thread connection on the device being tested and thereby secure the fixture to the device. The threaded coupling ring has the advantage of permitting easy installation and removal of the fixture.

The fixture further comprises a back plate welded to the main body and an adapter to be connected to a pressure or vacuum source. The fixture further comprises an optional insulator, which insulator has at least one through hole for allowing pressurized air or for a vacuum to be applied to the device being tested.

Other details of the fixture of the present invention, as well as other objects and advantages attendant thereto, are set forth in the following detailed description and the accompanying drawings wherein like reference numerals depict like elements.

DESCRIPTION OF THE PREFERRED EMBODIMENT(S)

Figure 1:
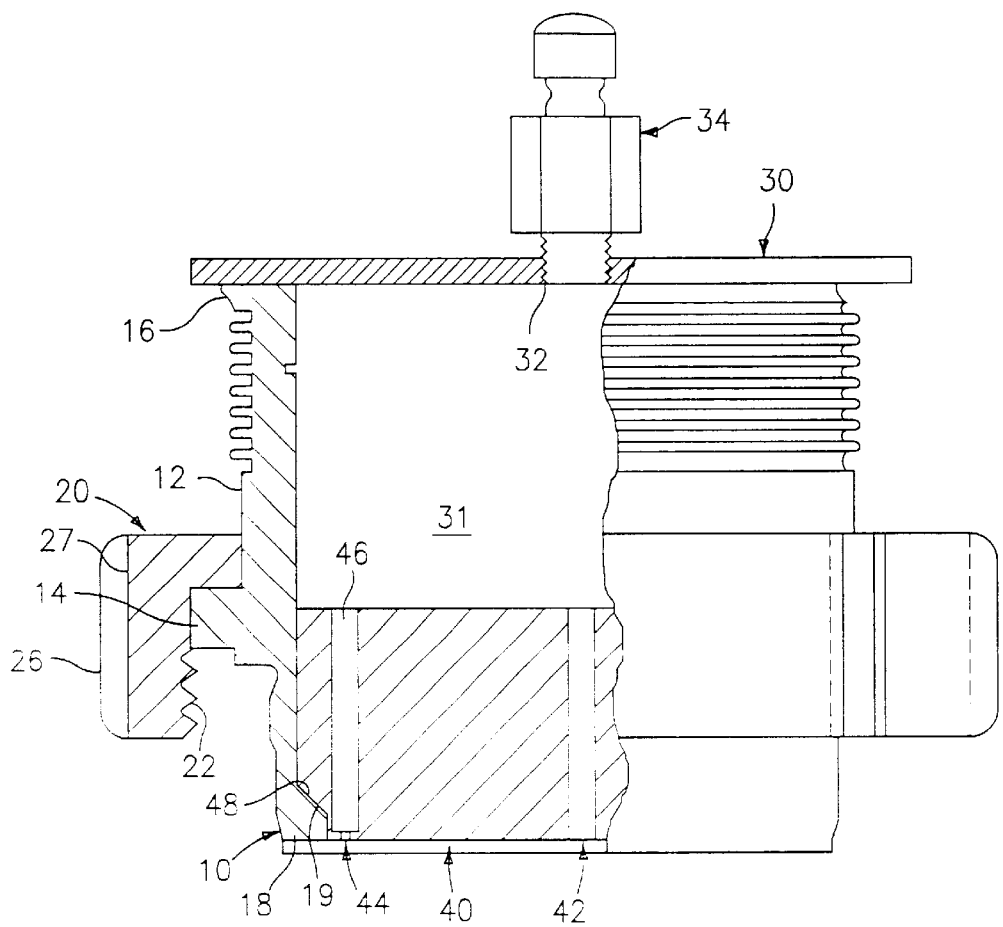
FIG. 1 is a sectional view of a fixture in accordance with the present invention.

In accordance with the present invention, a fixture 10 to be used in pressure/vacuum/leak testing is described. Referring now to FIG. 1, the fixture 10 has a main body 12 which is generally cylindrical in shape. The main body includes an integrally formed ring or shoulder 14. As can be seen from FIG. 1, a first end 16 of the main body has a plurality of threads or grooves to provide a user with a better gripping surface for disengaging the test fixture from a device being tested such as a missile tube penetrator. A second end 18 of the main body is provided with a beveled edge 19, whose purpose will be described hereinafter.

The body 12 and the integrally formed ring 14 may be formed from any suitable metal or non-metallic material known in the art. The fixture 10 has one or more keyways and an index pin to facilitate alignment with the alignment pins on the missile tube penetrator during installation of the test fixture.

Figure 2:
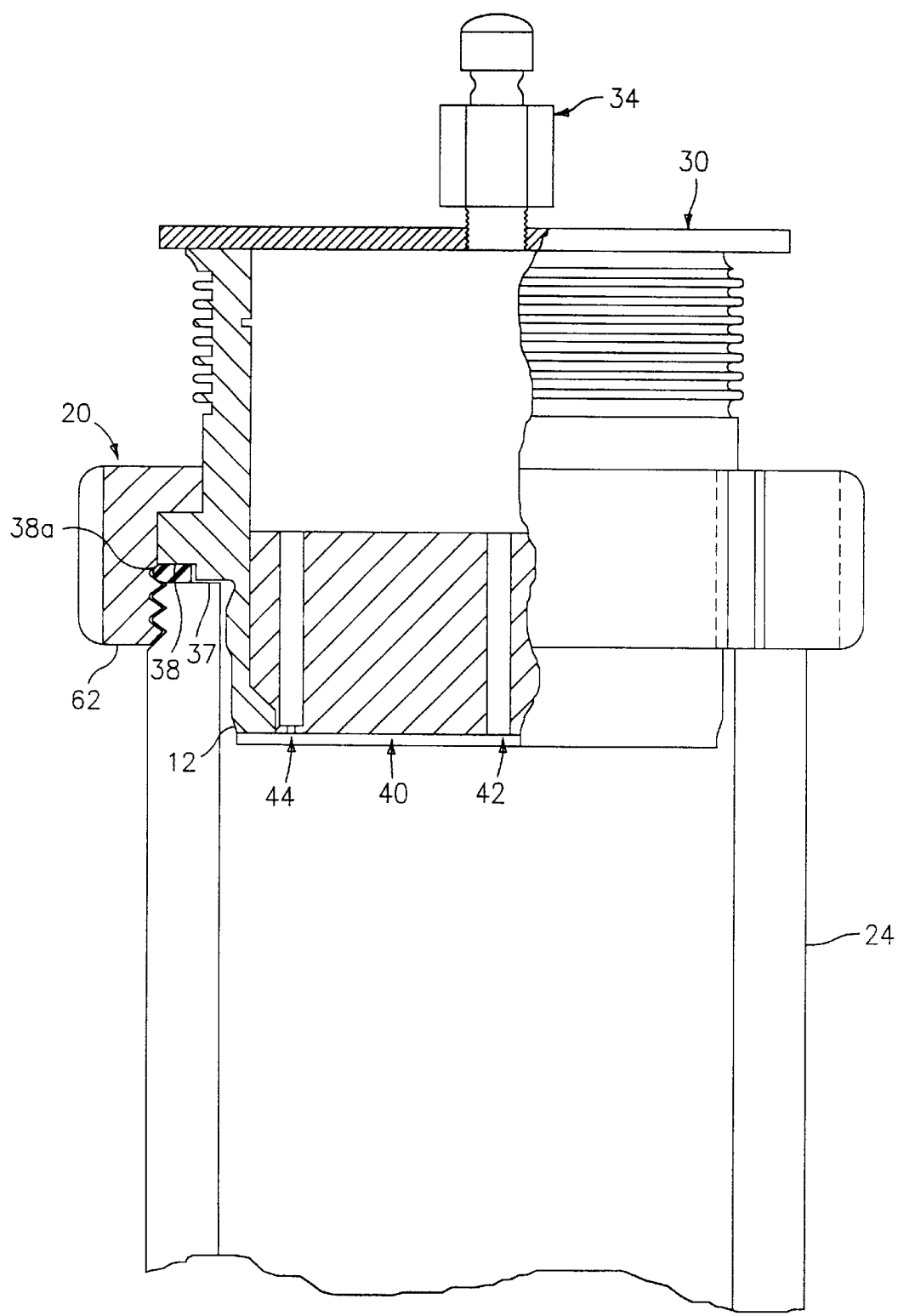
FIG. 2 is a sectional view of the fixture of FIG. 1 joined to a device to be tested.

The fixture 10 further includes a coupling ring 20. When in position, the coupling ring 20 is seated on the ring or shoulder 14. As can be seen from FIG. 1, the coupling ring is provided with a plurality of threads 22 on an interior surface. The threads 22 permit the coupling ring 20 to be joined to the device 24 to be tested (see FIG. 2) and thereby secure the fixture 10 to the device 24. The threaded coupling ring 20 facilitates installation and removal of the fixture 10 from the device 24. The exterior surface 26 of the ring 20 may have a plurality of slots 27 machined therein to assist in tightening and loosening the threaded portion 22 of the ring 20. Alternatively, the ring 20 may have a polygonally shaped outer surface 26 to allow a tool such as wrench to be used to install and remove the fixture 10 by tightening or loosening the threaded portion 22 of the coupling ring 20.

The fixture 10 further includes a back plate 30 welded to the first end 16. The back plate 30 is provided to form a pressure tight chamber 31 in the body 12 when the fixture 10 is mated to the device 24 to be tested. The back plate 30 may be formed from any suitable metallic or non-metallic material known in the art. The back plate 30 is provided with an aperture 32 for receiving one end of a pneumatic adapter 34 which is connected to either a source of pressure (not shown) or a vacuum source (not shown). The pneumatic adapter 34 may comprise any suitable pneumatic adapter known in the art.

Figure 3:
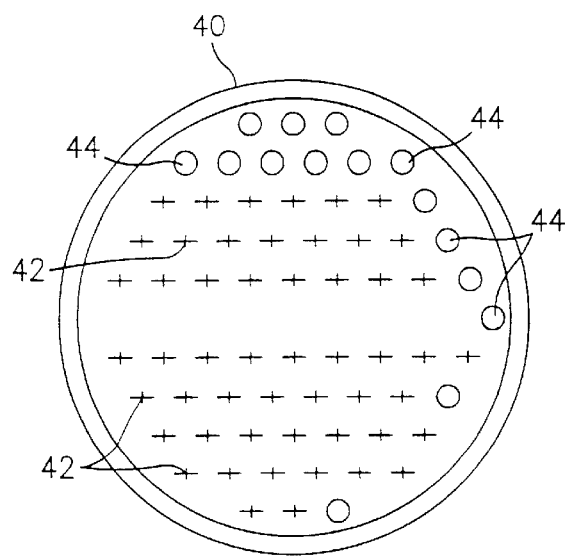
FIG. 3 is a bottom view of an optional insulator used in the fixture of FIG. 1.

An optional insulator 40 may be installed in the shell 12 adjacent the second end 18. The insulator 40 has at least one through hole 42 and at least one contact 44. As shown in FIG. 3, the insulator 40 may have a plurality of through holes 42 and a plurality of contacts 44. The contacts 44 are arranged to mate with the pins on the mating part or part under test. The insulator 40 may be formed from any suitable material known in the art and may have a one-piece or multi-piece construction.

The through hole(s) 42 are provided to allow either (i) pressurized fluid, such as pressurized air, to flow into the device 24 being tested, or (ii) a vacuum to be applied to the device 24 being tested. The contact(s) 44 are provided to engage the pins of the missile tube penetrator during test and to simulate the mechanical resistance of contacts during installation. The contact(s) 44 preferably comprise a plurality of pins 46 placed in through holes in the insulator 44 and held in place by clips (not shown) or molded in place.

As can be seen from FIG. 1, the insulator 40 has a beveled edge 48 which mates with and is seated on the beveled edge 19. When used, the insulator 40 may be joined to the main body 12 using any suitable technique known in the art such as welding, brazing, riveting or an internal retaining ring.

In use, the fixture 10 is placed over the device 24 to be tested so that a shoulder 38 on the main body 12 is in contact with an upper end 37 of the device 24 being tested. The fixture 10 is secured in position by engaging the threads 22 on the coupling ring 20 with the threads 62 on the device. An o-ring 38a which is installed against the shoulder 38 is compressed to fill the void between the upper end 37 and the shoulder 38, thus providing an airtight seal between the device being tested and the body 12. After the fixture 10 is installed on the device 24, a source of pressurized fluid, such as pressurized air, or a vacuum source is attached to the pneumatic adapter 34 and either pressure or a vacuum is applied to the device 24. The sealing integrity of the device 24 is verified if the pressure (or vacuum) drop does not exceed predetermined limits during a specified period.

The fixture 10 of the present invention provides a number of advantages. First, it verifies that there are no defects or damage on the face of the device being tested, such as a missile tube penetrator which seals against an O-ring or other sealing device in a mating connector, which would prevent proper sealing. Second, the fixture 10 of the present invention has particular utility in testing missile tube penetrators. The fixture 10 simulates a mating Capsule Launching System (CLS) umbilical cable connector and can be attached using the same procedure. This adds confidence that the sealing integrity of the missile tube penetrator is adequate.

It is apparent that there has been provided in accordance with the present invention a leak test fixture which fully meets the objects, advantages, and means set forth hereinbefore. While the present invention has been described in the context of specific embodiments thereof, other alternatives, modifications, and variations will become apparent to those skilled in the art having read the foregoing description. Therefore, it is intended to embrace all such alternatives, modifications, and variations that fall within the broad scope of the appended claims.

What is claimed is:

1. A fixture to be used in performing pressure/leak testing comprising:

a shell having a main body;

a coupling ring surrounding said main body;

said coupling ring having threads for engaging an external thread connection on the device to be tested and thereby joining said fixture to said device;

a back plate joined to an end of said main body to close said main body end and thereby form a pressure tight chamber in said fixture when said fixture is joined to the device to be tested;

an adapter for connecting said fixture to a source of pressurized fluid or a vacuum source; and an insulator positioned adjacent an end of said main body opposed to said end where said back plate is joined to said main body.

2. A fixture according to claim 1 wherein said insulator has at least one through hole for allowing said pressurized fluid to flow into said device being tested or for allowing said vacuum to be applied to said device being tested.

3. A fixture according to claim 1 further comprising said insulator having at least one contact to simulate a mechanical resistance.

4. A fixture according to claim 1 wherein said main body has an angled surface forming a seat for said insulator and said insulator has an angled surface which registers with said angled surface on said main body to position said insulator within said main body.

\* \* \* \* \*